(12) United States Patent
Evans

(10) Patent No.: US 10,557,494 B2
(45) Date of Patent: Feb. 11, 2020

(54) DEVICE AND METHOD FOR RETAINING A NUT

(71) Applicant: Joseph Evans, Powys (GB)

(72) Inventor: Joseph Evans, Powys (GB)

( * ) Notice: Subject to any disclaimer, the term of this patent is extended or adjusted under 35 U.S.C. 154(b) by 180 days.

(21) Appl. No.: 15/550,131

(22) PCT Filed: Jan. 27, 2016

(86) PCT No.: PCT/GB2016/050169
§ 371 (c)(1),
(2) Date: Aug. 10, 2017

(87) PCT Pub. No.: WO2016/128714
PCT Pub. Date: Aug. 18, 2016

(65) Prior Publication Data
US 2018/0023613 A1  Jan. 25, 2018

(30) Foreign Application Priority Data
Feb. 13, 2015 (GB) .................................. 1502366.6

(51) Int. Cl.
*F16B 39/10* (2006.01)

(52) U.S. Cl.
CPC ............. *F16B 39/101* (2013.01); *F16B 39/10* (2013.01)

(58) Field of Classification Search
CPC ........ F16B 39/00; F16B 39/10; F16B 39/101; F16B 39/24; F16B 39/32
USPC ...... 411/81, 84–85, 102, 103, 114–115, 166, 411/227
See application file for complete search history.

(56) References Cited

U.S. PATENT DOCUMENTS

| | | | | |
|---|---|---|---|---|
| 532,169 A * | 1/1895 | Smith | ..................... | F16B 39/10 411/128 |
| 821,297 A * | 5/1906 | Kohler | ..................... | F16B 39/24 411/81 |
| 2,225,132 A * | 12/1940 | Seaman | .................... | B60B 3/14 301/35.624 |
| 2,423,918 A * | 7/1947 | Wohlhieter | ........... | F16B 39/101 411/97 |
| 8,337,129 B2 * | 12/2012 | Boyce | ................... | F16B 31/028 411/102 |
| 8,708,627 B2 * | 4/2014 | Davies | .................. | F16B 39/101 411/102 |
| 8,950,824 B2 * | 2/2015 | Eck | ......................... | F16B 39/24 301/111.03 |

(Continued)

*Primary Examiner* — Roberta S Delisle
(74) *Attorney, Agent, or Firm* — Antonio Papageorgiou; Meister Seelig & Fein LLP

(57) ABSTRACT

A retaining device is disclosed for retaining a wheel fastener. The retaining device comprises a main body attachable to a wheel. An engagement portion is arranged to engage with the wheel fastener, the engagement portion comprising at least one opening for, in use, permitting a wheel fastener to extend through the opening, wherein the engagement portion is moveable with respect to the main body. A stop mechanism is co operable with the engagement portion, such that the engagement portion is moveable in a first direction so as to permit the wheel fastener to become secured and the engagement portion is prohibited from moving in a second direction by the stop mechanism so as to restrict movement of the wheel fastener in the second direction.

18 Claims, 8 Drawing Sheets

(56) References Cited

U.S. PATENT DOCUMENTS 9,057,396 B2 * 6/2015 Prince .................. F16B 39/101
2010/0008743 A1 * 1/2010 Bawden ................ F16B 39/10
411/130

* cited by examiner

DEVICE AND METHOD FOR RETAINING A NUT

This invention relates to a device and a method for retaining a wheel fastener in a predetermined position, in particular a wheel nut.

Drivers have a responsibility to ensure their vehicles are roadworthy and well maintained. As well as putting drivers and others at risk, if defects are not dealt with promptly, it can cost drivers money, for example by increasing fuel use and/or the overall cost of repairs, and can increase pollutants associated with the vehicle. A common critical defect in vehicles relates to the wheels.

For example, loose wheel nuts can occur for a variety of different reasons whereby undertorquing, overtorquing, differential thermal contraction and improper mating surfaces are all potential sources of loose wheel nuts. Therefore, the loose wheel nut can originate from any of these sources individually, or from a combination of these sources. This makes the task of eliminating loosening of wheel nuts very difficult.

Wheels of a vehicle experience a variety of forces as the vehicle moves, accelerates and brakes. As a wheel nut loosens, these forces are redistributed among the remaining nuts, especially those located adjacent to the loose nut, causing these nuts to themselves loosen. The loosening process accelerates with each successive nut that loosens, as the total clamping force reduces and the stress concentration on the remaining nuts increases, and may cause the nuts to fracture due to fatigue and over stress. This is especially problematic when applied to vehicles having a heavy cargo.

As soon as the wheel force exceeds the clamping force of the remaining nuts, the wheel will move relative to the hub worsening the effect even more and if not detected in time, the wheel may become completely detached.

The rate of this process will vary depending on the type and magnitude of the wheel forces applied.

This can have a highly detrimental effect since if the wheels are not kept in good repair, the driver as a consequence could lose control of the vehicle, or fail to respond in time in an emergency, with potentially fatal results. In the worst case scenario when the wheel becomes completely detached from the vehicle as it is moving, the detached wheel can accelerate up to great speeds, and could potentially hit an oncoming vehicle, pedestrian or cyclist. It could also cause the driver of the vehicle to lose control and crash. It is believed that several hundred wheel detachments occur each year in the UK, mostly involving heavier commercial vehicles.

It is known to use wheel nut indicator devices to check whether the wheel nuts have moved.

However, such devices comprise plastic pointers which only provide a guide to the position of the wheel nuts and they do not prevent the wheel nuts becoming loose. The pointers work by having pairs of pointers aligned. However if the wheel nuts have not been monitored regularly enough it is feasible that a full rotation of the wheel nut indicator (or nuts) is permitted prior to the visual inspection of a driver causing them to appear to be aligned. Consequently, whilst it appears as though the wheel nut position has been maintained and the vehicle is safe for use, the wheel nut is in fact loosened and an additional load is applied to the remaining wheel nuts, adversely causing the loosening effect described above.

A wheel nut retainer is available on the market that comprises separate protective nut caps, at least 2 of which are specially moulded together. The nut caps sit on the nuts of a commercial vehicle to help protect and retain them in the correct orientation. The objective of the wheel nut retainer is to lower the likelihood of the nut loosening, protecting the wheel nut from weathering and reducing the ingress of dirt.

However, the nut caps completely cover the nuts and it is not possible to visually inspect and adjust the nuts, which can be detrimental to maintenance procedures. Therefore, to aid visual inspection of the wheel nuts and maintenance, the nut cap needs to be firstly removed to provide access to the nuts, thereby prolonging the maintenance procedure. The application of wheel trims on coaches (some for aerodynamic reasons) also lead to the requirement for the trims to be removed prior to a visual check of the nut pointers being carried out. This can also be an awkward and time consuming additional step.

Therefore, the present invention and its embodiments are intended to address at least some of the above described problems and desires. In particular to minimise the loosening of wheel nuts and to enable access to the wheel nuts at all times to aid the wheel maintenance and inspection requirements. Therefore, the present invention is expected to improve safety and to reduce any downtime for both vehicle and driver which can be a substantial cost.

According to a first aspect of the invention there is provided a retaining device for retaining a wheel fastener, comprising
 a main body attachable to a wheel;
 an engagement portion arranged to engage the wheel fastener, the engagement portion being moveable with respect to the main body,
 the engagement portion comprising an opening for, in use, permitting a wheel fastener to extend through the opening; and
 a stop mechanism co operable with the engagement portion, the engagement portion being moveable in a first direction so as to permit the wheel fastener to become secured and the engagement portion being prohibited from moving in a second direction by the stop mechanism so as to restrict movement of the wheel fastener in the second direction.

The engagement portion may comprise an annular portion, wherein at least part of the inner surface of an opening of the annular portion is provided with corrugations, the corrugations being co operable with an outer surface of the wheel fastener.

The corrugations may comprise an array of teeth extending along the inner surface of the opening of the annular portion.

The thickness of the engagement portion may be less than the thickness of the wheel fastener to which it is applied.

The stop mechanism may comprise an elongate portion, one end of which is moveably fixed to the main body and the other end of which is engageable with an outer surface of the engagement portion.

The stop mechanism may comprise a resilient member which is co operable the elongate portion.

The resilient member may be a spring.

The main body may comprise an aperture and the inner surface of the aperture is configured to be spaced apart from the external side edge of an engagement portion arrangeable within the aperture.

The outer edge of the engagement portion may be terminated by an array of teeth.

The teeth may be sloped in a common direction.

The teeth may be arranged uniformly about the circumference of the engagement portion.

The teeth may be asymmetric.

The stop mechanism may be configurable to abut a side wall of a tooth located on the outer edge of the engagement portion so as to provide a stopping effect in the second direction.

The engagement portion may be solely rotatable in the first direction.

The main body may comprise at least two apertures; and an engagement portion having an opening located within each of the apertures, the openings being co operable with respective wheel fasteners located on the wheel to which the retaining device is applied.

The main body may be annular, wherein the main body may comprise apertures arranged at equidistant intervals about a circumference of the annulus, each aperture may comprise an engagement portion having an opening and each opening being co operable with a respective wheel fastener on the wheel.

The number of openings may be equal to the number of wheel fasteners to be secured on the wheel.

At least two of the openings may be arrangeable to receive a fixing means for attaching the main body to a wheel.

A single stop mechanism may be provided per engagement portion.

The main body may further comprise fixing holes for receiving a fixing means for attachment of the main body to a wheel.

The retaining device may further comprise a port for receiving a device for tightening the wheel fastener.

The retaining device may further comprise a bracket attachable to the wheel, the bracket may be configured to receive and secure the main body thereto.

The bracket may comprise a central plate with at least two arms extending radially therefrom at opposing side edges, the arms may comprise fixing holes.

In a further aspect of the invention there is provided a wheel comprising a retaining device according to any preceding claim.

In a further aspect of the invention there is provided a vehicle comprising a retaining device according to any preceding claim.

According to a further aspect of the invention there is provided a method of retaining a wheel fastener applied to a wheel using a retaining device, the retaining device comprising a main body attachable to a wheel; an engagement portion, the engagement portion comprising an opening and being moveable with respect to the main body; and a stop mechanism, the method comprising:
  applying the wheel fastener to the wheel so as to extend the wheel fastener through the opening;
  engaging the engagement portion with the wheel fastener;
  securing the main body to a wheel;
  permitting rotation of the engagement portion in a first direction so as to provide movement of the wheel fastener in the first direction; and
  prohibiting movement of the engageable portion in a second direction so as to prevent movement of the wheel fastener in the second direction.

At least two openings may be provided, the method may further comprise applying a fixing means through at least one of the openings so as to secure the main body to the wheel.

The method may further provide a fixing hole to the main body for receiving a fixing means so as to attach the main body to the wheel.

The method may further comprise attaching a bracket to the wheel via a central fixing means and then subsequently attaching the main body to the bracket.

The engagement portion may be rotated in the first direction.

Whilst the invention has been described above it extends to any inventive combination of the features set out above, or in the following description, drawings or claims. For example, any features described in relation to any one aspect of the invention is understood to be disclosed also in relation to any other aspect of the invention.

Whilst the invention has been described above it extends to any inventive combination of the features set out above, or in the following description, drawings or claims. For example, any features described in relation to any one aspect of the invention is understood to be disclosed also in relation to any other aspect of the invention.

The invention will now be described, by way of example only, with reference to the accompanying drawings, in which:—

Figure 1:
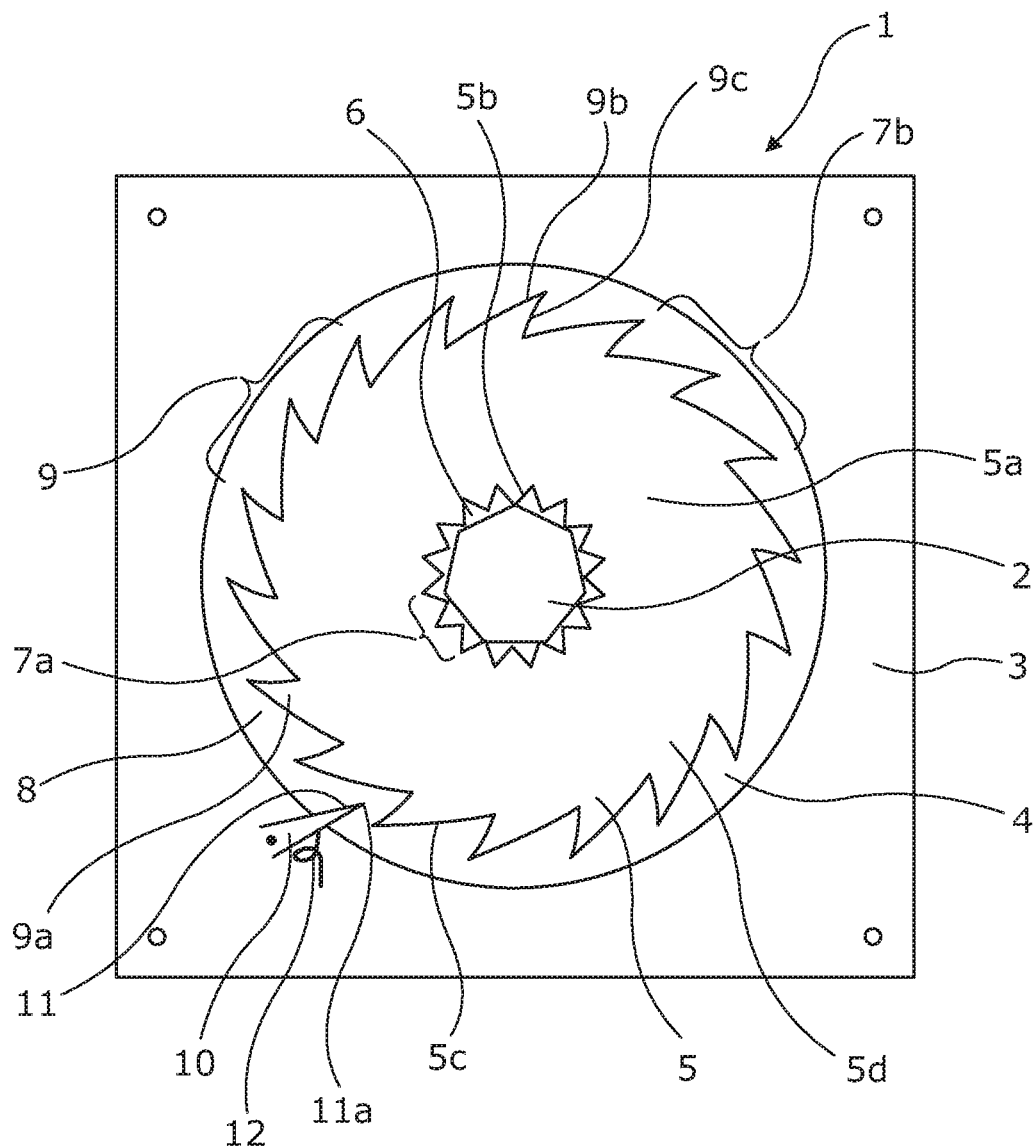
FIG. 1 is a front view of the retaining device according to the invention having a single aperture.

Referring firstly to FIG. 1, there is shown a retaining device 1 for a wheel fastener 2, for example a wheel nut. A main portion 3 is attachable to a front surface of a wheel having a wheel fastener 2. The main portion 3 is a metal plate that comprises a circular aperture 4. The main portion 3 is secured to the wheel such that a wheel fastener 2 located on the wheel protrudes through the aperture 4. An engagement portion 5 is located within the aperture 4. The engagement portion 5 comprises an annular portion 5a. The inner edge 5b of an opening 6 of the annular portion 5a is provided with corrugations 7a. The exterior edge 5c of the annular portion 5a is also provided with corrugations 7b. The engagement portion 5 therefore comprises a gear type structure. The engagement portion 5 is moveable within and is arranged coaxially with the aperture 4 of the main body 3. A gap 8 is provided between the outer edge of the engagement portion 5c and the aperture edge 4a of the main body 3 so as to enable movement of the engagement portion 5 therein. The external corrugations 7b of the engagement portion 5 are formed of an array of teeth 9 protruding from the outer side edge 5c of the annular portion 5a. The teeth 9 are uniformly arranged, however have an asymmetrical form whereby each tooth 9a has a moderate slope on one edge 9b and a steeper slope on the other edge 9c. Each tooth 9a in the array is sloped by a common direction and angle.

A stop mechanism 10 is co-operable with the external teeth 9 of the annular 5 engagement portion. The stop mechanism 10 is formed of an elongate portion 11, for example a pawl (a spring loaded finger), which is pivotally attached to the main body 3. The remote end 11a of the pawl 11 is engageable with a portion of the outer edge 5c of the engagement portion 5. When the engagement portion 5 is rotated in a first direction the pawl 11 slides over the moderate slope 9b of the teeth 9 and a resilient member 12, for example a spring causes the pawl 11 to fall into a depression located at the interface region positioned between teeth 9 once a tooth 9a has been passed. However, when the engagement portion 5 is caused to move in the second direction which opposes the first direction, the pawl 11 comes into contact with the steeply sloped side edge 9c of a tooth 9a and prevents movement of the engagement portion 5 in the second direction, thereby providing a stopping effect in the second direction. Therefore, a ratchet arrangement 13 is provided.

Therefore, the stop mechanism 10 permits movement of the engagement portion 5 in a first direction, however, prevents movement of the engagement portion 5 in a second direction, which opposes the first direction. Therefore, a wheel nut or other wheel fastener 2 may be tightened due to movement of the wheel nut 2 in the first direction and may be prevented from becoming loose due to the prevention of movement of the wheel nut 2 in the second direction. The movement in question is rotational movement whereby the first direction may correspond to a clockwise direction and the second direction may correspond to an anticlockwise direction, or vice versa, depending on the orientation of the device on the wheel.

The annular nature of the engagement portion 5 also permits protrusion of the wheel nut though the opening 4.

The opening 4 of the engagement portion 5 is configured to permit sufficient slackness to ease the fitting of the wheel fastener 2 through the opening 4 of the engagement portion 5. This is especially important when several engagement portions 5 are to be applied to several wheel nuts 2 located on a wheel. This ease of fitting is further aided by the backlash associated with the engagement portion 5. The backlash occurs because the backward motion of the engagement portion can only be stopped at discrete points which are defined by the tooth boundaries, therefore backward motion of the engagement portion may be provided which is limited to a maximum distance equal to the spacing between adjacent teeth 9. The slight slackness described above and the backlash effect both aid the fitting of the retaining 1 device to multiple wheel nuts 2 located on a wheel.

The use of tapered or chamfered edged nuts (where the wheel nuts may be partially trimmed) may also aid the fitting of the retaining device 1 by providing a guide effect. Alternatively, a tapered inner side edge of the engagement portion may ease the fitting of the retaining device. Neither taper is essential and this device can be applied on existing nuts applied to wheels.

It is important that sufficient contact is made between the apex of the teeth 9 located on the inner side edge of the engageable portion 5 and the apex of the vertices of the wheel fastener 2 i.e. wheel nut, such that a master follower relationship is provided; the engagement portion 5 being the master and the wheel fastener 2 being the follower.

Figure 2:
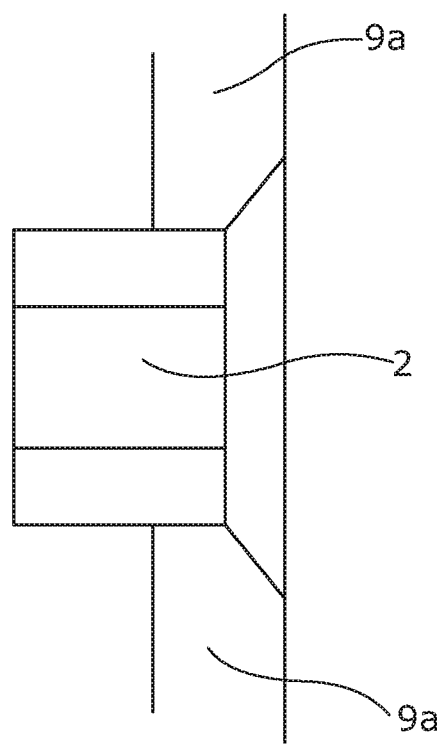
FIG. 2 is a side view of part of the engagement portion and the wheel fastener.

As shown in FIG. 2, the thickness of the engagement portion 5 must not exceed the thickness of the wheel fastener 2 in order to provide suitable access to the nut by a socket (not shown). This tightening of the wheel fastener 2 is required when it becomes loosened due to the removal of, for example, paint or dirt from its surface.

Figure 3:
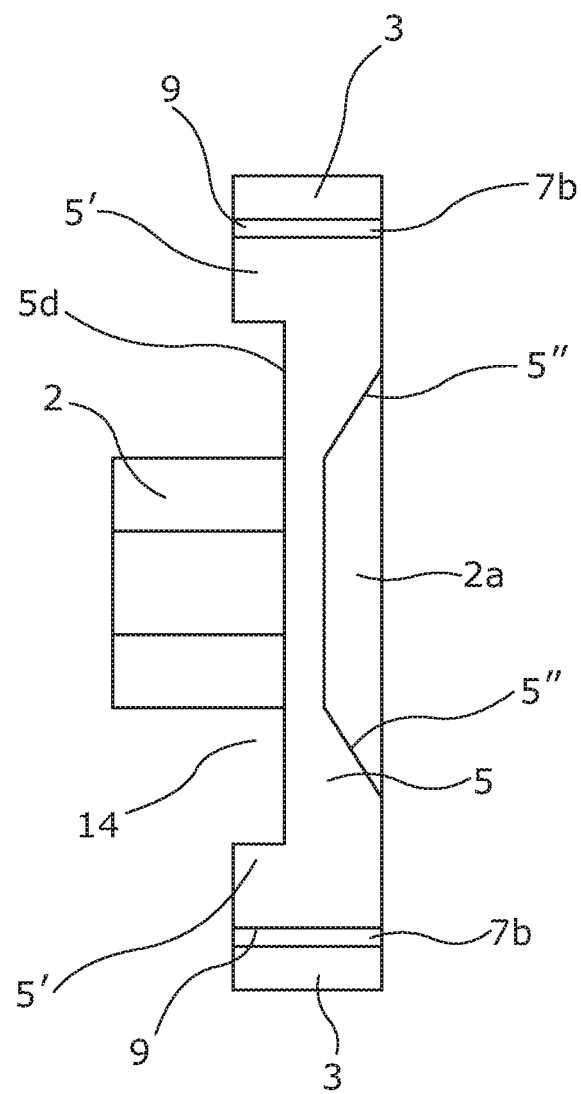
FIG. 3 is a cross sectional view of the retaining device applied to a wheel fastener.

The thickness of the ratchet arrangement 13 (i.e. which is formed of the engageable portion and the stopping means) is carefully selected so that the wheel fastener 2 extends through the opening of the engagement portion 5 and past the front face of the main body 3, allowing for a heavy duty socket or a wheel brace to be applied to the protruding end of the wheel fastener. This effect is best shown in FIG. 3 which shows a portion of the main body 3 and a rim region 5' of the engagement portion extending past the inner front face 5d of the engagement portion 5 so as to create a port 14 for receiving at least a portion of the socket (not shown). The port 14 is shaped and sized to help maintain the position of the socket when in use and therefore enables the socket to be countersunk within the retaining device 1 when tightening the wheel nut 2. The wheel brace for a wagon or coach is likely to exceed the diameter of a normal socket and therefore the diameter of the port 14 must be sized to permit the insertion of such devices.

FIG. 3 also shows the back face 5" of the engageable portion 5 to be tapered so as to cooperate with a sloped portion of a washer 2a associated with the wheel nut 2. This optimises the contact region between the engagement portion 5 and the wheel fastener 2 e.g. wheel nut. The washer 2a may be inbuilt with the wheel nut 2.

The thicker the moveable, engagement portion, the less area is available on the nut for the socket to be used.

Figure 4:
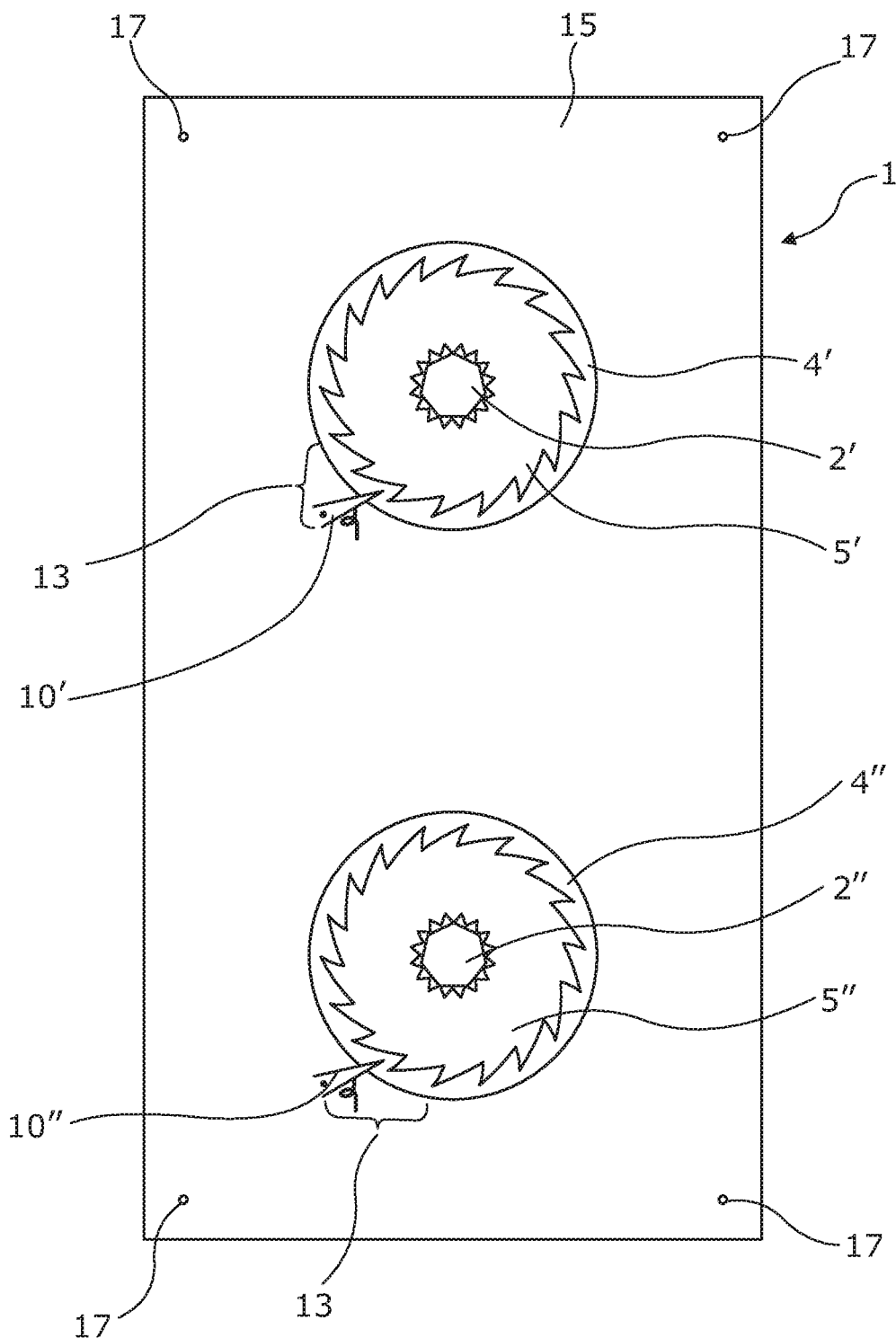
FIG. 4 is a front view of the retaining device having a double aperture and ratchet arrangement.

In FIG. 4, it is shown that instead of using a single main body 3 per nut, an elongate plate 15 may be applied with two apertures 4', 4" located in a spaced apart relationship along the longitudinal axis of the plate 15. Engagement means 5 are located within the respective apertures 4. The opening of the first engagement portion 5' is to be fitted over a first wheel nut 2' located on the wheel and the opening of the second engagement portion 5" is to be fitted over a second wheel nut 2" located on the wheel. Therefore, each aperture 4 is associated with a corresponding ratchet arrangement 13 which comprises an engageable portion 5 and a stop mechanism 10. For this reason, two stop mechanisms 10', 10" are provided at spaced intervals on the plate 15.

Figure 5:
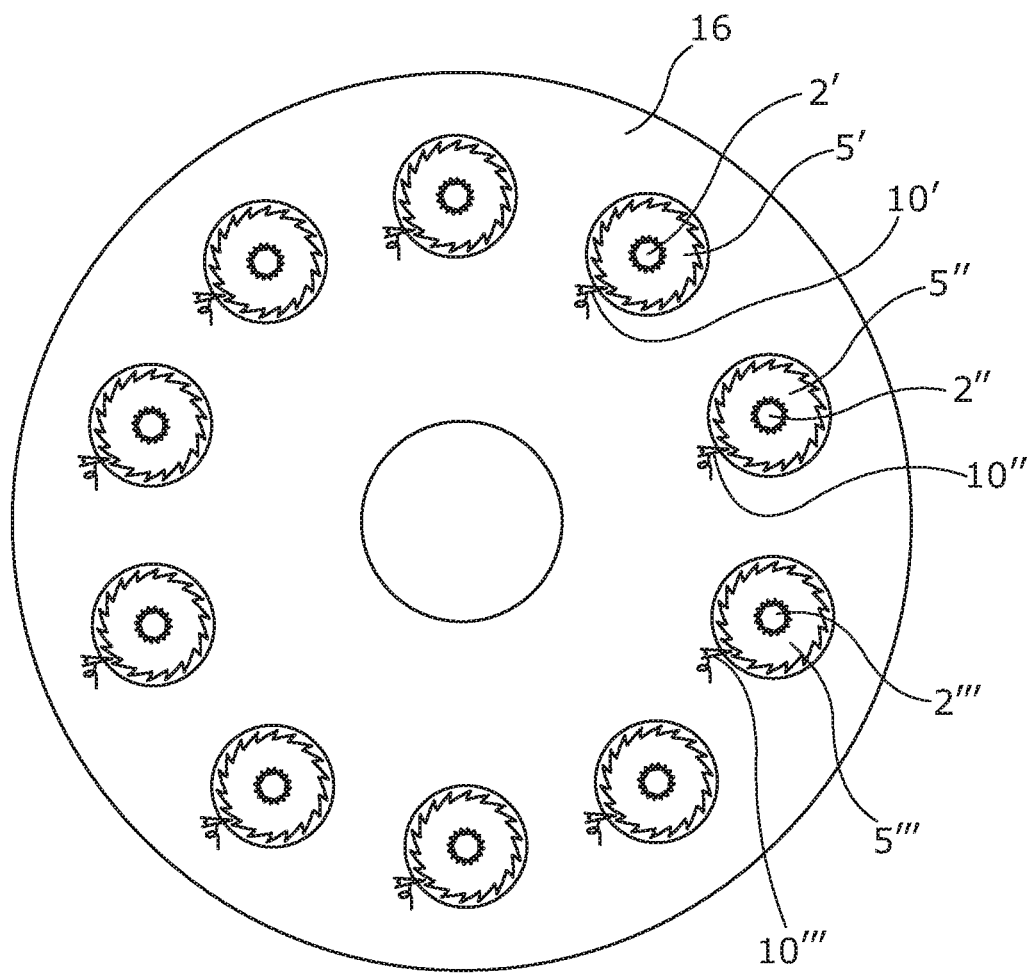
FIG. 5 is a front view of an annular retaining device having several apertures with corresponding ratchet arrangements.

FIG. 5 shows an annular main body 16 comprising multiple apertures located at equidistant intervals about a circumference of the annulus. An engagement portion 5 is inserted within each aperture 4. The objective is to fit the annular main body 16 such that each wheel fastener 2 is received in a corresponding opening 6 of the engagement portion 5. Therefore, the number of openings 6 and the number of stop mechanisms (10', 10", 10'" . . . ) are equal to the number of wheel fasteners 2 to be secured and the spacing between openings 6 matches the spacing between wheel nuts 2.

In the arrangements of FIGS. 1, 2 and 4, the main body 3 further comprises fixing holes 17 for receiving a fixing means (not shown) for attaching the main body 3 to the wheel.

However, in the arrangement of FIG. 5, instead of additional fixing holes 17 being provided, at least two of the openings 6 may be arrangeable to receive a fixing means (not shown), for example a screw or bolt, for attaching the main body 3 to the wheel. For example, the main body 3 of the device 1 may be attached to a wheel having ten studs, by positioning the main body 3 under two of the studs 2', 2" meaning that only eight studs can be retained out of the possible ten. However, in the case that the two studs 2', 2" that are holding the main body 3 in position become loose, the retaining device 1 will become detached. Therefore, to prevent this problem and to ensure that each of the studs 2 are retained in position, the main body 3 and the wheel can be drilled and the device may be retained in position by the screwing method as described previously.

Figure 6:
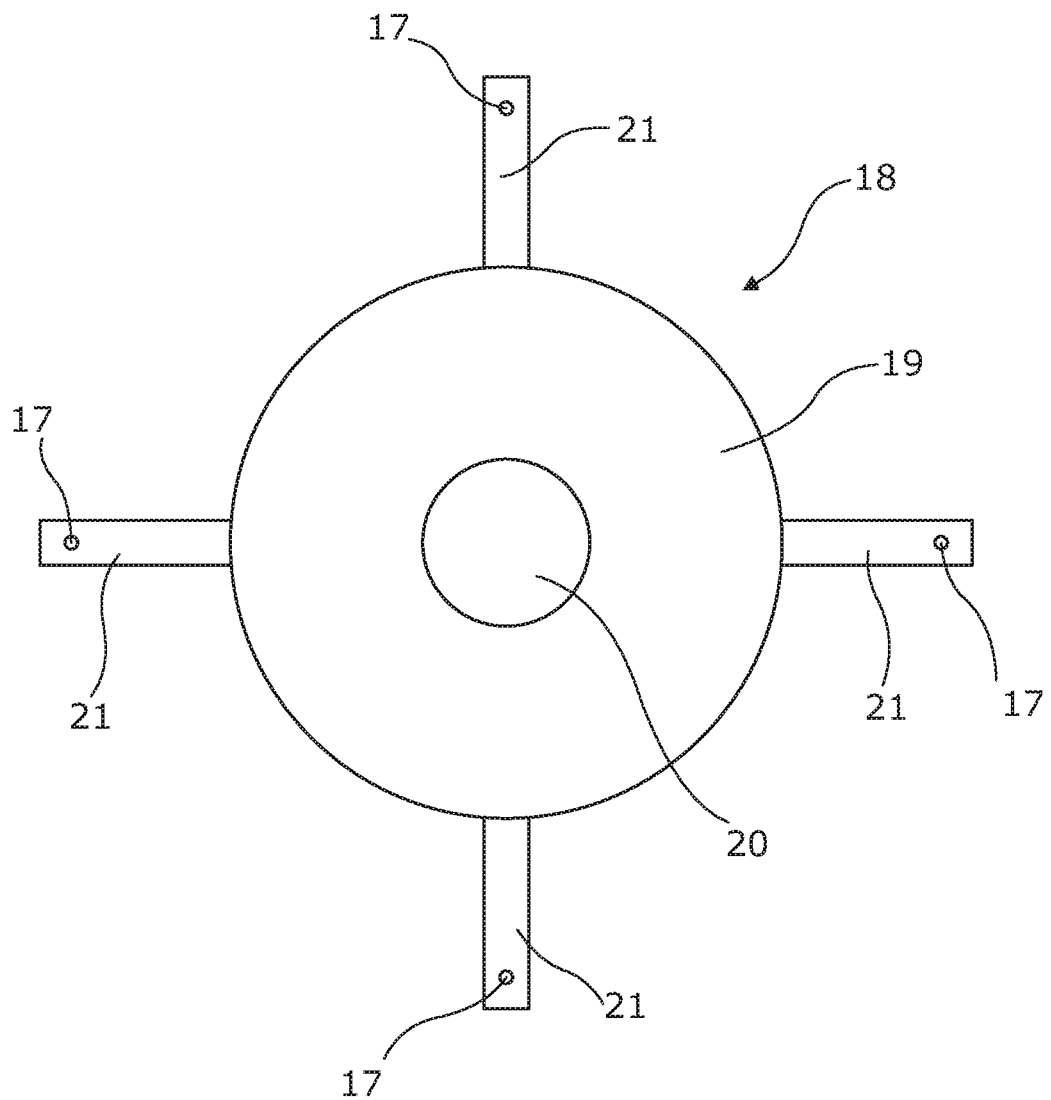
FIG. 6 is a front view of a bracket to be used with the devices of FIGS. 1 to 5.

Alternatively, a bracket arrangement 18 may be used as shown in FIG. 6, whereby a central plate 19 is provided having an aperture 20 at its centre and which is secured by the central bolt or hub of the wheel itself. Four arm extensions 21 protrude radially at equal angular intervals from the central plate 19. Fixing holes 17 are provided at a region on the respective arm extensions 21. The main body 3 of the retaining device 1 is then attached to the bracket 18 by securing a fixing means (not shown) through the co operable fixing holes 17. This arrangement allows for the retaining device 1 to maximise the number of fasteners 2 to which it is applied, whilst securing the retaining device 1 to the wheel without the need to drill into the wheel itself. The bracket 17 may vary in shape, for example a star shape may be implemented.

In use, the retaining device 1 is applied to the wheel and the main body 1 and is attached to the wheel such that the at least one opening 6 of the engagement portion 5 permits a wheel fastener 2, e.g. wheel nut, to protrude there-through. The inner corrugations 7a of the engagement portion 5 are arranged to come into contact with at least a portion of the wheel nut 2. A stop mechanism 10 is provided to co operate with the external side edge 5c of the annular engagement portion 5, which is terminated by corrugations 7b formed from an array of teeth 9. This arrangement enables movement of the engagement portion 5 in a first direction so as to provide movement of the wheel nut 2 in the first direction; and the stop mechanism 10 prohibits movement of the engagement portion 5 in a second direction opposing the first direction. The stop mechanism 10 provides the stopping effect as it makes contact with the steeply sloped side wall 9c of a tooth arranged on the outer surface 5c of the engagement portion 5. A single aperture 4 and ratchet arrangement 13 is provided per wheel fastener 2 as shown in FIG. 1 and FIG. 4. In FIG. 5, a first and second fixing means is applied to the first and second opening 6 of the retaining device 1 so as to secure the main body 3 to the wheel. Alternatively, fixing holes 17 are drilled for receiving a fixing means so as to attach the main body 3 to the wheel. The movement specified above is rotational movement of the engagement portion 5 in the first direction.

The moveable engagement portion 5 and the spring 12 associated with the pawl 11 must be constructed from a good quality metal that is free from rust. Therefore, the materials used in the unit must be completely resistant to corrosion or treated to resist salt spray etc.

Advantageously, the device 1 can be applied on both left hand and right hand threaded wheel nuts 2 by turning the retaining device 1 around the other way.

Various modifications to the principles described above would suggest themselves to the skilled person. For example, if a thicker metal is used to form the ratchet arrangement 13, thicker wheel nuts 2 would need to be applied to permit tightening of the nuts by the socket or wheel brace.

Pointers (not shown) may still be used and aligned with corresponding marks on the main body 3 of the retaining device 1 so that when the nuts 2 are correctly torqued before fitting the retaining device 1 the markers and pointers are aligned in the usual way. Therefore, when the wheels are tightened at a later date, the pointers and markers will show how much the nuts 2 have been tightened or loosened (unless of course the tightening or loosening has exceeded one complete revolution of the nut).

In an alternative embodiment, the mark on the outer part of the fixing plate, which is attachable to the wheel centre, is aligned with the mark on the engageable part of the ratchet assembly prior to the unit being fitted on the wheel. If a new wheel has been fitted and it has recently been painted, the heat on the wheel as a result of the brakes might cause the paint to melt and may cause some slackness, resulting in the overall torque not being at the correct value. The same slackness may result if the studs have lengthened because of excessive heat as a result of heavy use of the brakes. By lining up the marks prior to fitting the unit, when the wheel nuts are checked and tightened, it will be evident how much they have been tightened, unless the nuts have rotated by a complete revolution, which in itself would show that there was a problem with stud stretching.

In an alternative embodiment the unit will be sealed by the use of O rings or another suitable form of seal so as to prevent the ingress of salt water and dirt, however any attachments that fit over the nut must not be too tight (since a slight slackness will make the sealing portion easier to fit and remove).

Whilst the movement of the engagement portion 5 is described above as rotational movement, a gear assembly or other mechanical arrangement (not shown) may be applied that translates a linear movement to the required rotational movement required by the wheel nuts.

The aperture 4 need not be circular, and may take another shape, for example rectangular.

If access to the nut 2 is not required, the wheel nut need not be annular and may instead be a circular disc providing a cover protecting the wheel nut from dirt and salt.

The pawl 11 may be operated with an alternative resilient member differing from the spring, but also performs the task of biasing the default position of the remote end 11a of the pawl 11.

Figure 7:
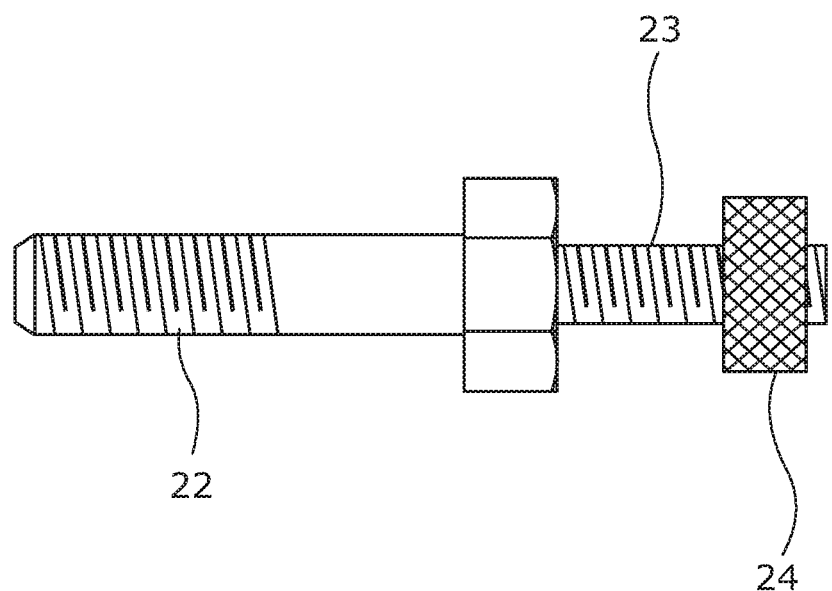
FIG. 7 is a side view of a fixing means used to secure the device to a wheel.

As shown in FIG. 7, a further alternative for fixing the retaining device 1 to the wheel may be to use rear hub screws or grease cap screws on front axle hubs if they are available. When half-shaft or front axle grease cap bolts 22 are applied for holding the retaining device in position, specially designed bolts are to be used which prevent the need for constant removal of the bolts (which can slacken after being removed on several occasions). The bolts should be retained as originally fitted but should comprise a threaded part 23 on the outer end of the bolt, enabling self-locking nuts 24 to be applied. This arrangement saves the removal of the bolt from the axle (half-shafts) or front grease caps.

Figure 8:
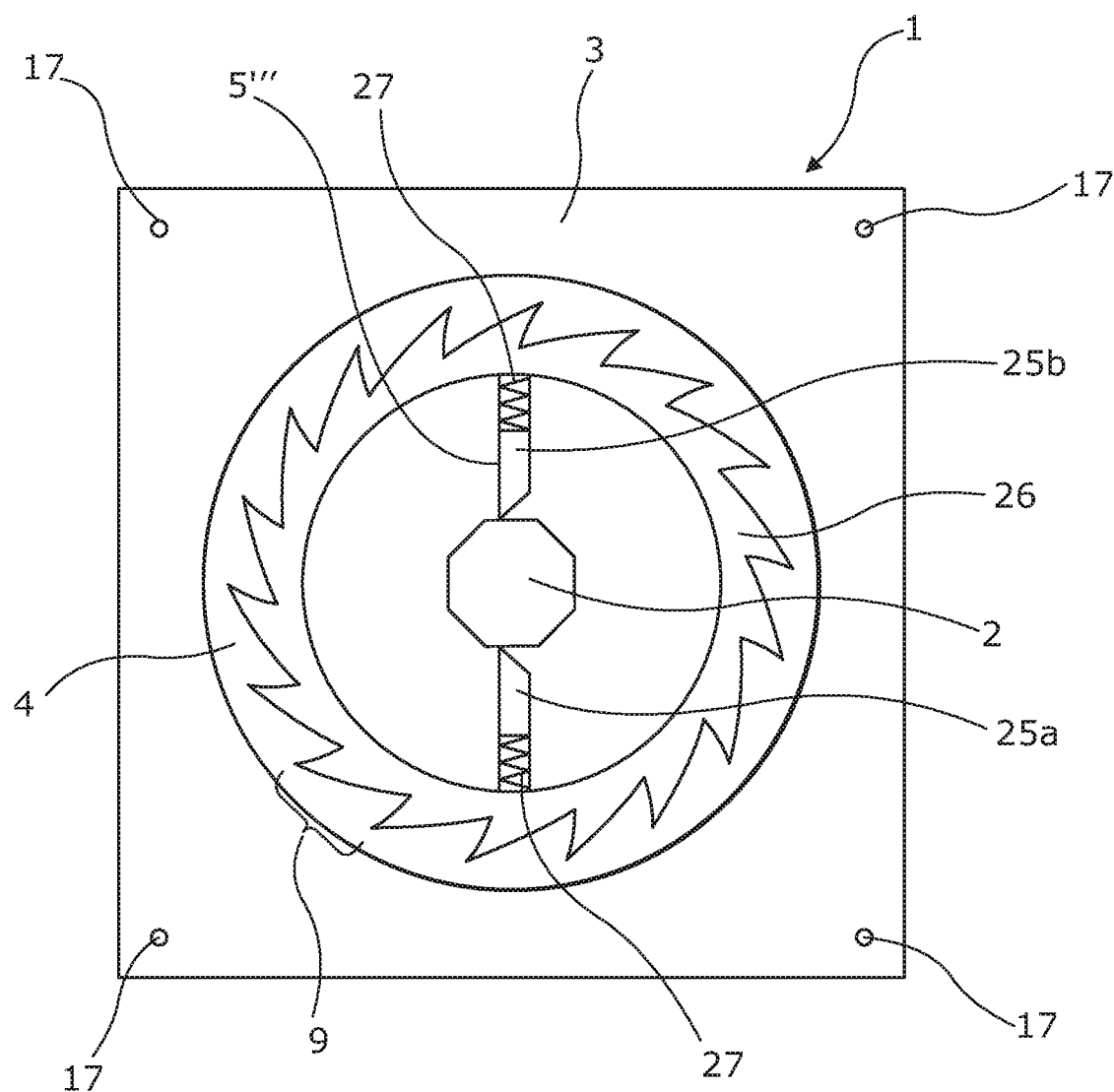
FIG. 8 is a front view of an alternative embodiment of the retaining device.

In an alternative embodiment as shown in FIG. 8, a first protuberance 25a extends radially inwards from an annular moveable portion 26 at a first position and the second protuberance 25b extends radially inwards from the annular moveable portion at a second position. Therefore, the first and second protuberance 25a, 25b are annularly separated. The length of the protuberances is such that in use the distal end of the first and second protuberances 25a, 25b are co-operable with a surface of the wheel nut 2. The first protuberance 25a and the second protuberance 25b are arranged substantially opposite to each other so as to, in use, make contact with opposing sides of the wheel nut 2. Therefore, the arrangement forms an alternative engagement portion 5′″.

When the aperture 4, wheel nut 2 and the alternative engageable portion 5′″ are perfectly (coaxially) aligned, the first and second protuberance 25a, 25b are required to be the same length. However, in the case that there is a slight offset between the wheel nut 2 and the main body 3, and also to aid application of the device 1, the first and second protuberances 25a, 25b are attached to the moveable portion 26 by a resilient member 27, for example a spring. Therefore, the length of the first and second protuberances are adjustable.

The invention claimed is:

1. A retaining device for retaining a wheel fastener, comprising a main body attachable to a wheel;
an engagement portion arranged to engage the wheel fastener, the engagement portion being moveable with respect to the main body, the engagement portion comprising an opening for, in use, permitting a wheel fastener to extend through the opening;
a stop mechanism co operable with the engagement portion, the engagement portion being moveable in a first direction so as to permit the wheel fastener to become secured and the engagement portion being prohibited from moving in a second direction by the stop mechanism so as to restrict movement of the wheel fastener in the second direction, and
a bracket attachable to the wheel, the bracket being configured to receive and secure the main body thereto.

2. A retaining device according to claim 1, wherein the engagement portion comprises an annular portion, wherein at least part of the inner surface of an opening of the annular portion is provided with corrugations, the corrugations being co operable with an outer surface of the wheel fastener.

3. A retaining device according to claim 2, wherein the corrugations comprise an array of teeth extending along the inner surface of the opening of the annular portion.

4. A retaining device according to claim 1, wherein the stop mechanism comprises an elongate portion, one end of which is moveably fixed to the main body and the other end of which is engageable with an outer surface of the engagement portion.

5. A retaining device according to claim 1, wherein the main body comprises an aperture and the inner surface of the aperture is configured to be spaced apart from the external side edge of an engagement portion arrangeable within the aperture.

6. A retaining device according to claim 1, wherein the outer edge of the engagement portion is terminated by an array of teeth.

7. A retaining device according to claim 6, wherein the stop mechanism is configurable to abut a side wall of a tooth located on the outer edge of the engagement portion so as to provide a stopping effect in the second direction.

8. A retaining device according to claim 1, wherein the engagement portion is solely rotatable in the first direction.

9. A retaining device according to claim 1, wherein the main body comprises at least two apertures; and an engagement portion having an opening located within each of the apertures, the openings being co operable with respective wheel fasteners located on the wheel to which the retaining device is applied.

10. A retaining device according to claim 1, wherein the main body is annular, the main body comprising apertures arranged at equidistant intervals about a circumference of the annulus, each aperture comprising an engagement portion having an opening and each opening being co operable with a respective wheel fastener on the wheel.

11. A retaining device according to claim 10, wherein at least two of the openings are arrangeable to receive a fixing means for attaching the main body to a wheel.

12. A retaining device according to claim 1, wherein the main body further comprises fixing holes for receiving a fixing means for attachment of the main body to a wheel.

13. A retaining device according to claim 1, further comprising a port for receiving a device for tightening the wheel fastener.

14. A retaining device according to claim 1, wherein the bracket comprises a central plate with at least one arm extending radially therefrom at opposing side edges, the arms comprising fixing holes.

15. A method of retaining a wheel fastener applied to a wheel using a retaining device, the retaining device comprising a main body attachable to a wheel; a bracket attachable to the wheel; an engagement portion, the engagement portion comprising an opening and being moveable with respect to the main body; and a stop mechanism, the method comprising:
attaching a bracket to the wheel via a central fixing means and then subsequently attaching the main body to the bracket;
applying the wheel fastener to the wheel so as to extend the wheel fastener through the opening;
engaging the engagement portion with the wheel fastener;
securing the main body to a wheel;
permitting rotation of the engagement portion in a first direction so as to provide movement of the wheel fastener in the first direction; and
prohibiting movement of the engageable portion in a second direction so as to prevent movement of the wheel fastener in the second direction.

16. A method according to claim 15, wherein at least two openings are provided, the method further comprising applying a fixing means through at least one of the openings so as to secure the main body to the wheel.

17. A method according to claim 15, further comprising providing a fixing hole to the main body for receiving a fixing means so as to attach the main body to the wheel.

18. A method according to claim 15, wherein the engagement portion is rotated in the first direction.

* * * * *